United States Patent [19]

Womack et al.

[11] 4,193,843
[45] Mar. 18, 1980

[54] APPARATUS AND METHOD FOR DETECTING DEFECTIVE FUEL RODS

[75] Inventors: Robert E. Womack; William E. Lawrie, both of Lynchburg, Va.; Alfred Jester, Speyer, Fed. Rep. of Germany

[73] Assignee: Babcock-Brown Boveri Reaktor GmbH, Mannheim, Fed. Rep. of Germany

[21] Appl. No.: 764,797

[22] Filed: Feb. 2, 1977

[30] Foreign Application Priority Data

Feb. 14, 1976 [DE] Fed. Rep. of Germany ....... 2605962

[51] Int. Cl.² .............................................. G21C 17/00
[52] U.S. Cl. ................................................ 176/19 LD
[58] Field of Search ............................ 176/19, 37, 80; 73/67.8 R, 71.5 US

[56] References Cited

U.S. PATENT DOCUMENTS

| 2,494,433 | 1/1950 | Erwin | 73/71.5 US |
|---|---|---|---|
| 3,063,290 | 11/1962 | Kaserman et al. | 176/19 R |
| 3,205,702 | 9/1965 | Joy | 73/71.5 US |
| 3,279,242 | 10/1966 | Megoloff | 73/71.5 US |
| 3,602,036 | 8/1971 | Peterson | 73/71.5 US |
| 3,901,090 | 8/1975 | Akey et al. | 176/19 R |
| 3,945,245 | 3/1976 | Stehle et al. | 176/19 LD |
| 3,967,382 | 7/1976 | Johnson et al. | 176/19 R |
| 3,987,666 | 10/1976 | Blanc et al. | 176/19 R |
| 4,004,698 | 1/1977 | Gebelin | 165/76 |
| 4,009,616 | 3/1977 | Wonn | 176/19 LD |
| 4,036,686 | 7/1977 | Weilbacher et al. | 176/19 R |

FOREIGN PATENT DOCUMENTS

| 2423782 | 11/1975 | Fed. Rep. of Germany | 176/19 R |
|---|---|---|---|
| 2528422 | 12/1976 | Fed. Rep. of Germany | 176/19 R |
| 5114597 | 5/1976 | Japan | 176/19 R |
| 511893 | 9/1976 | Japan | 176/19 R |

OTHER PUBLICATIONS

S2640 0032—"Nuclear Reactor Applications of New Ultrasonic Transducers", Lywnworth et al., pp. 351–362.

Primary Examiner—David H. Brown
Assistant Examiner—S. A. Cangialosi
Attorney, Agent, or Firm—Robert J. Edwards; Robert H. Kelly

[57] ABSTRACT

Defects in the fuel rods of nuclear fuel assemblies are ascertained and located by ultrasonic means. The fuel assemblies are subjected to ultrasonic waves. Differences in fuel rod resonance is indicative of defective rods.

8 Claims, 6 Drawing Figures

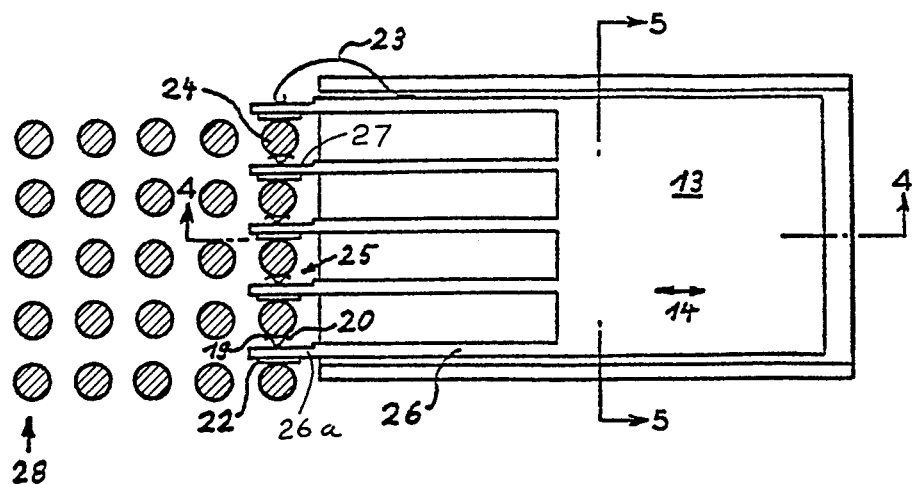
FIG. 3
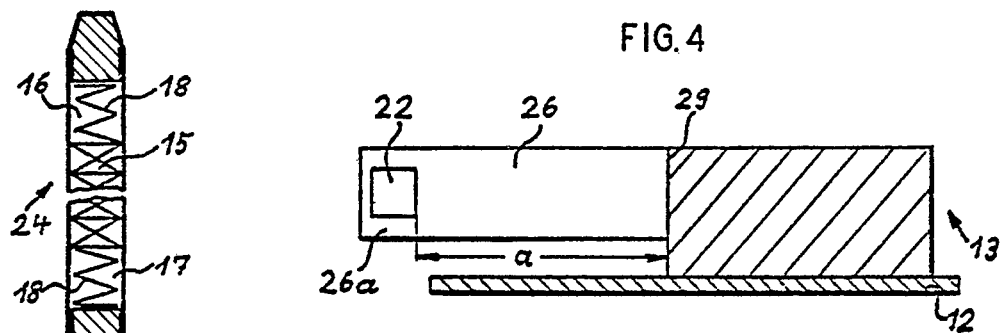
FIG. 2
FIG. 4
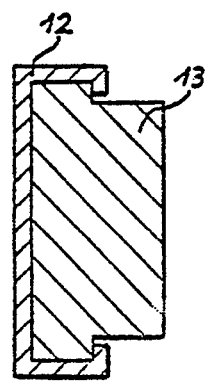
FIG. 5
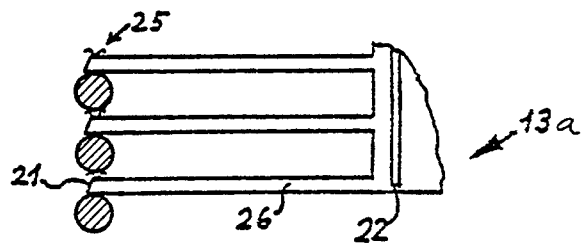
FIG. 6

APPARATUS AND METHOD FOR DETECTING DEFECTIVE FUEL RODS

BACKGROUND OF THE INVENTION

1. Field of Invention

The invention relates to a method and an apparatus for locating defective fuel rods within fuel assemblies of water cooled nuclear reactors, and the like.

2. Description of the Prior Art

The core of a light water-cooled reactor, for instance, typically consists of about 40 to 50 thousand fuel rods which are usually arranged in groups of about 200 rods to form a fuel assembly. A fuel assembly for a reactor of this nature consists of two end fittings, control rod guide tubes and spacer grids for positioning the rods. The fuel rods consist of Zircaloy-4 cladding tubes which contain the fuel in oxide form and are closed at both ends with welded caps.

During prolonged operation, several rods may develop leaks so that cooling water can seep in or radioactive material can escape. The coolant purification system of the nuclear reactor is capable of handling a certain amount of radioactive fission products. However, it is desirable to keep the radiation level as low as possible in order to protect the operating personnel. Accordingly, the fuel assemblies are usually subjected to a so-called "seepage test" during shutdowns of the reactor, e.g. during refueling. The fuel assembly is placed in a water filled storage tank for this test. The fuel rods and the water heat up by residual decay. If a fuel assembly contains a defective rod, the fission products escape during the heating into the water. Through sampling of the water it can be determined whether the fuel assembly contains defective rods. This method is a totalizing method which determines only whether the fuel assembly contains defective rods. It cannot, however, identify the position or the location of the defect.

U.S. Pat. No. 3,983,741 suggests removing the upper end fitting from the fuel assembly, and slipping an immersion cask over the exposed fuel rod end caps while keeping the upper ends of the fuel rods above the water. Water seeping into defective rods evaporates due to the decay heat. Instrumentation can detect temperature differences of rods containing steam.

It is known from U.S. Pat. No. 3,945,245 to remove the end fittings from the fuel assembly, to slip a heating element on the endcaps of the fuel rods and to detect the generation of steam or condensate in the rods containing water by ultrasonic means.

Therefore, in accordance with these patents, it is possible to locate defective fuel rods. A disadvantage of these methods is that the end fitting of the fuel assembly must be removed and special provisions must be made to evaporate the ingressed water before the defective rods can be found by the instrumentation.

A further disadvantage is that in many fuel assembly designs only the lower end fitting is removable. The lower fuel assembly end fitting is installed in the reactor at the bottom end of the fuel rods. Therefore, before this end fitting can be removed the fuel assembly must be turned 180 degrees under the water in the fuel storage pool, an additional time consuming operation.

The seepage test, the disassembly of the end fitting and the evaporation of the leaked-in water, require a time consumption which is a loss in availability of the power plant. In addition, every operator of a nuclear power plant strives to keep the testing times of the fuel elements at a minimum to reduce the exposure time of the maintenance crew. When the allowable exposure limit is exceeded, a new crew must be employed.

Thus, a need has arisen to find a simpler inspection method for locating defective fuel rods which could reduce the required time and minimize the radiation exposure of the maintenance crew.

SUMMARY OF THE INVENTION

This task has been solved, by insertion of ultrasonic transducer heads into the spaces between the individual fuel rods disposed to touch the fuel rods and to emit ultrasonic waves perpendicularly to their axes. The resulting difference in the resonance is an indication of leaked-in water.

During the periodic fuel replacement outages about one-third of the fuel assemblies (batch I) are removed from the reactor core as fully spent fuel. The other two-thirds, which consist of two further batches having different U-235 enrichments are relocated according to a certain carefully planned scheme and placed in different positions in the core for optimum utilization.

An advantageous provision of this invention is the ability to inspect (test) the fuel assemblies during the relocation in the water filled canal arranged above the reactor.

It has become advantageous to test the fuel assemblies of "batch I" during the transport from the water filled canal to the fuel storage pool. The fuel assemblies of batch I which contain defective fuel rods are stored in separate storage tanks in order to prevent the escape of fuel or radioactive materials into the storage pool.

The detector transducer heads are preferably applied in the region of the lower gas space of the fuel rods where, according to experience, the leaked-in water accumulates when the reactors are not under pressure. Normally, the testing of fuel rods is accomplished at that condition.

The device used to perform the inspection method of this invention contains a carriage provided with comb-like fingers. The carriage is arranged to slide along guides of a support plate. The fingers are fitted with ultrasonic heads which are pressed against the fuel rods by springs. The comb-like fingers are arranged on only one side of the carriage and the ultrasonic heads are attached at the free end of the fingers.

An advantageous embodiment is obtained when the support plate is attached to the fuel-handling machine. The testing in this manner can be performed during the transportation of a fuel assembly.

It has proven also beneficial to make the entire fingers from a material which conducts ultrasonic waves so that the ultrasonic heads do not have to be placed at the free ends of the fingers.

The method of this invention has the advantage that testing can be accomplished immediately after removal of the fuel assembly from the reactor core at a significant time saving. The disassembly of the end fitting and the waiting for the evaporation in the defective fuel rods is not required. Thus, the expensive seepage test becomes superfluous, because the present simple and fast method does not require a pre-testing for fuel assemblies containing defective fuel rods.

A considerable time saving is achieved in comparison with the previous methods. Refueling time can therefore be considerably shortened thereby improving the economics of the power plant's operation.

BRIEF DESCRIPTION OF THE DRAWINGS

FIG. 2 represents a section through a fuel rod.
FIG. 3 is a section along the line 3—3 of FIG. 1.
FIG. 4 is a section along line 4—4 of FIG. 3.
FIG. 5 is a section along line 5—5 of FIG. 3.
FIG. 6 shows a plan view of a special embodiment of the test device.

DESCRIPTION OF THE PREFERRED EMBODIMENTS

Figure 1:
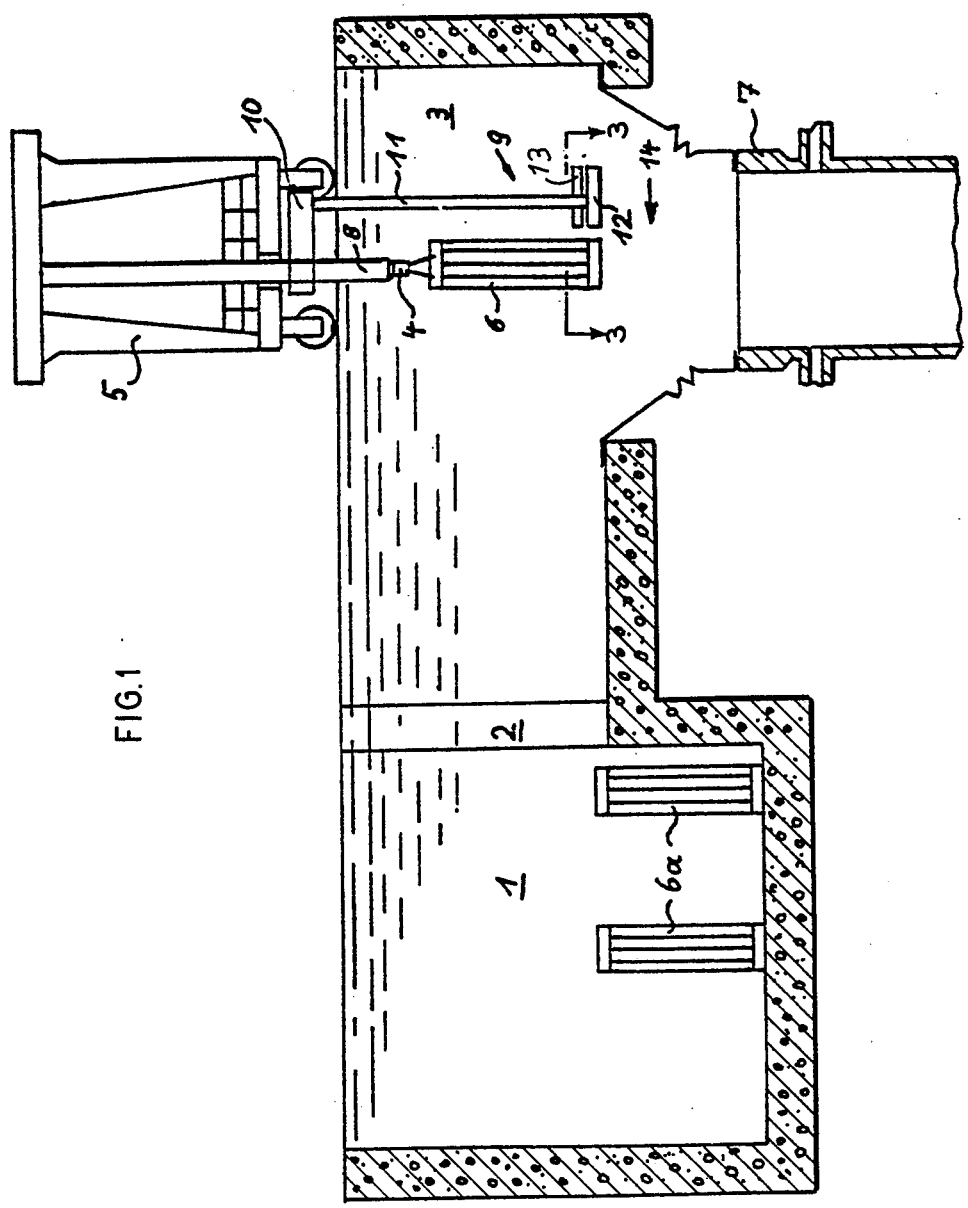
FIG. 1 shows a schematic section through a part of a reactor plant.

FIG. 1 shows a storage pool 1 for fuel assemblies. A separating gate 2 is removed so that the same water level exists in the fuel storage pool 1 and in the flooding canal 3. The removal and replacement of fuel assemblies is performed in a known way using a telescoping grapple tool 4 suspended from a hoist 5 which removes the fuel assembly 6 vertically from the reactor vessel 7.

The test apparatus 9 is attached to the mast 8 through support 10 of the hoist making it possible to identify defective fuel rods while the fuel assembly 6 is still hanging over the reactor vessel, during the transportation to the storage pool 1 or when the fuel assemblies 6a are stored in the storage pool.

The test apparatus consists of a main support 10 which is attached to the mast 8. Vertical support members 11 are attached to the main support 10 and a support plate 12 is connected at the bottom of the members 11. A carriage 13 with comb-like arranged fingers slides along rails of the support plate 12. Ultrasonic transducer heads are attached to the free ends of the fingers. The members 11 can be moved vertically by means of a telescoping device. The main support 10 can be rotated around the mast 8 to permit access to a fuel assembly from all sides.

The carriage 13 with the ultrasonic transducer heads is moved in the direction of the arrow 14 in the region of the lower fuel rod ends and perpendicularly to the fuel rod axis. From FIG. 2, which schematically represents a single fuel rod 24, it can be seen that above and below the stack of fuel pellets 15 there is an upper empty space 16 and lower empty space 17, respectively. A spring 18 is located to bear on the end caps of the fuel rods and serves to support the fuel pellets and maintain them in proper position. When the reactor is shutdown, the water which leaked into the defective fuel rods collects in the empty space 17. Therefore, the testing will be performed mainly in the region of the lower fuel rod ends.

FIG. 3 shows the testing device in contact with the first row of fuel rods of the fuel assembly. A fuel assembly with 5×5 fuel rods is shown for simplicity. The device can also be used for fuel assemblies with 17×17 fuel rods. The carriage 13 is provided with fingers 26 which at their free ends (26a) have ultrasonic transducer heads 22 attached by adhesive means.

The distance between fuel rods of a pressurized water reactor is about 2 to 3 mm. The fingers are therefore made of thin metal strips of a cross section of 1×20 mm. The ultrasonic transducing head is a vibrating crystal of about 1 mm thickness obtainable from the pertinent industry. A small wavy strip spring 25 is attached, e.g. by rivets or spot welding, in a depression 27 of the finger 26 opposite of the ultrasonic head. During the insertion of the device between the fuel rods 24 the hump 19 of the spring is depressed and the fuel rod is locked between the humps 19 and 20 of the spring, so that the ultrasonic test head 22 is pressed against the opposite fuel rod. The water surrounding the fuel assemblies serves as the coupling medium between the ultrasonic transducer and the fuel rod. The ultrasonic head 22 which induces vibration is connected through electronic wiring to instrumentation and the resonance of the ultrasonic waves is conducted to an instrument (not shown) for evaluation. The signals from the various fuel rods can be compared which permits a determination of the amount of water that leaked-in or the size of the crack. The testing of a single row of fuel rods requires about 20 seconds, so that a fuel assembly consisting of 17×17 rods can be tested in about 6 minutes. Since electronic transducers are used the number of fuel rods in the assembly is of minor significance.

A special spring 23 is used to provide the required pressure on the outer fuel elements in each row.

FIG. 4 shows a single finger 26 with the ultrasonic head 22. This figure represents a section along line 4—4 of FIG. 3. It can be seen that the ultrasonic head 22 is arranged at the free end 26a of the finger. The distance "a" between the head and the beginning of the comb-like fingers is long enough to permit insertion to the last row of fuel rods 28 (FIG. 3).

FIG. 5 shows an example of the guide rails for the carriage 13 on the support plate 12 which is in the form of flat slides. The movement of the carriage in the direction of the arrows 14 can be accomplished by hydraulic, pneumatic or electric drive means (not shown).

A special design of the fingers and the ultrasonic transducer heads is shown on FIG. 6. The ultrasonic head 22 is inserted into the body of the carriage 13a. The ultrasonic impulses are transmitted to the tested fuel rod through an ultrasonic wave conductor of low absorption losses such as aluminum, which is used to form the finger 26. For this purpose it is necessary to provide the free end of the finger with a forty-five degree end surface 21 to obtain a ninety degree deflection of the sound waves towards the fuel element. In this arrangement, the known good sound wave conductance of aluminum is advantageously utilized.

The method of this invention is not to be limited to water cooled reactors, but may be applied to reactors cooled by any fluid.

We claim:

1. Apparatus for the in situ testing of a fuel rod to locate a defective fuel rod in a nuclear fuel assembly of the type having a multiplicity of fuel rods spaced apart by a fixed distance comprising a support plate, a carriage, at least one elongated finger dimensioned to traverse the spaces between the fuel rods extensibly appended from the carriage, the carriage being slideably mounted on the support plate for transversely moving the finger within the spaces between the fuel rods, at least one ultrasonic transducer head fixedly attached to one side of the free end of the finger, spring means mounted on the other side of the finger opposite the ultrasonic transducer head biasing the finger from an adjacent fuel rod for pressing the ultrasonic transducer head against the fuel rod to be tested and means operatively connected to the ultrasonic transducer head for generating an ultrasonic resonance signal in the fuel rod to be tested and for comparing differences in resonance of the fuel rods as an indication of ingressed water.

2. Apparatus according to claim 1 in which said support carriage is provided with a comb-like arrangement of a plurality of said fingers.

3. Apparatus according to claim 2 in which the said support carriage is provided on one side only with said comb-like fingers and the ultrasonic heads are located at the free finger ends.

4. Apparatus according to claim 3 wherein said support carriage further comprises a support plate having guides and means for said comb-like fingers to slide along said guides of said support plate.

5. Apparatus according to claim 2 in which said fingers are completely manufactured from a material suitable for transmitting ultrasonic waves.

6. A method for in situ testing of fuel rods to locate a defective fuel rod in a nuclear fuel assembly of the type having a multiplicity of fuel rods spaced apart by a fixed distance utilizing a support plate, a carriage slideably mounted on the support plate, at least one elongated finger dimensioned to traverse the spaces between the fuel rods and extensibly appended from an the carriage, at least one ultrasonic transducer head fixedly attached to one side of the free end of the finger, and spring means mounted on the other side of the finger opposite the ultrasonic transducer head biasing the finger from adjacent fuel rod and pressing the ultrasonic transducer against the fuel rod to be tested comprising the sequential steps of:

(a) transversely moving the finger within the spaces between the fuel rods, (b) transversely contacting a fuel rod to be tested with the transducer head.

(c) transversely subjecting the fuel rod to ultrasonic waves so as to generate an ultrasonic resonance signal.

(d) comparing the differences in the resonance signals of the fuel rods as an indication of ingressed water.

7. A method according to claim 6 in which the ultrasonic transducer head is applied in the region of the lower gas space of the fuel rods.

8. A method according to claim 1 in which the said ultrasonic transducer head is applied in the region of the lower gas space of the fuel rods.

* * * * *